US011714891B1

(12) United States Patent
Cao et al.

(10) Patent No.: US 11,714,891 B1
(45) Date of Patent: Aug. 1, 2023

(54) FRICTIONLESS AUTHENTICATION FOR LOGGING ON A COMPUTER SERVICE

(71) Applicant: Trend Micro Incorporated, Tokyo (JP)

(72) Inventors: Jing Cao, Nanjing (CN); Quan Yuan, Nanjing (CN); Bo Liu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 717 days.

(21) Appl. No.: 16/255,273

(22) Filed: Jan. 23, 2019

(51) Int. Cl.
*G06F 3/048* (2013.01)
*G06F 21/36* (2013.01)
*G06F 3/0354* (2013.01)
*G06F 3/0482* (2013.01)
*H04L 9/40* (2022.01)
*G06F 21/31* (2013.01)
*G06F 3/04886* (2022.01)
*G06F 3/04815* (2022.01)
*G06F 3/0486* (2013.01)

(52) U.S. Cl.
CPC .............. *G06F 21/36* (2013.01); *G06F 3/0482* (2013.01); *G06F 3/03543* (2013.01); *G06F 21/316* (2013.01); *H04L 63/08* (2013.01); *G06F 3/0486* (2013.01); *G06F 3/04815* (2013.01); *G06F 3/04886* (2013.01); *H04L 2463/082* (2013.01)

(58) Field of Classification Search
CPC ........ H04L 63/08; G06F 21/316; G06F 21/32; G06F 3/0482
See application file for complete search history.

(56) References Cited

U.S. PATENT DOCUMENTS

| 7,021,534 | B1 | 4/2006 | Kiliccote |
| 7,802,298 | B1 | 9/2010 | Hong et al. |
| 8,019,689 | B1 | 9/2011 | Nachenberg |
| 8,516,581 | B2 | 8/2013 | Hsu et al. |
| 8,776,196 | B1 | 7/2014 | Oliver et al. |
| 9,477,822 | B1 | 10/2016 | Liao et al. |
| 9,843,602 | B2 | 12/2017 | Tsao et al. |
| 10,027,708 | B2 | 7/2018 | Tsao et al. |
| 2002/0059170 | A1 | 5/2002 | Vange |
| 2005/0160330 | A1 | 7/2005 | Embree et al. |
| 2005/0177649 | A1 | 8/2005 | Chung et al. |
| 2006/0064374 | A1 | 3/2006 | Helsper et al. |
| 2006/0070126 | A1 | 3/2006 | Grynsberg |
| 2006/0101120 | A1 | 5/2006 | Helsper et al. |
| 2006/0123464 | A1 | 6/2006 | Goodman et al. |
| 2006/0123478 | A1 | 6/2006 | Rehfuss et al. |
| 2006/0168066 | A1 | 7/2006 | Helsper et al. |
| 2007/0101148 | A1 | 5/2007 | Schutz et al. |
| 2007/0112814 | A1 | 5/2007 | Cheshire |
| 2007/0263872 | A1 | 11/2007 | Kirkup et al. |

(Continued)

*Primary Examiner* — Aleksey Olshannikov
(74) *Attorney, Agent, or Firm* — Beyer Law Group LLP

(57) ABSTRACT

A login authentication process to access a computer service includes displaying a virtual keyboard on a display screen of a computer. A user enters a password by clicking on the virtual keyboard. The manner the user clicked on the virtual keyboard to enter the password is compared to the manner an authorized user of the computer service clicked on the virtual keyboard to enter an authorized password during a learning phase. The login authentication is deemed to be a success when the password matches the authorized password, and the manner the user clicked on the virtual keyboard to enter the password matches the manner the authorized user clicked on the virtual keyboard to enter the authorized password.

14 Claims, 15 Drawing Sheets

(56) References Cited

U.S. PATENT DOCUMENTS

| | | | |
|---|---|---|---|
| 2007/0282739 | A1 | 12/2007 | Thomsen |
| 2008/0020814 | A1 | 1/2008 | Kernene |
| 2008/0028444 | A1 | 1/2008 | Loesch et al. |
| 2008/0082662 | A1 | 4/2008 | Dandliker et al. |
| 2009/0070595 | A1 | 3/2009 | Delia et al. |
| 2010/0037064 | A1 | 2/2010 | Ku |
| 2010/0195825 | A1 | 8/2010 | Cini |
| 2010/0228994 | A1 | 9/2010 | Kang |
| 2010/0302157 | A1* | 12/2010 | Zilberman ............. G06F 21/83 345/164 |
| 2011/0126289 | A1 | 5/2011 | Yue et al. |
| 2012/0079282 | A1 | 3/2012 | Lowenstein et al. |
| 2013/0019191 | A1* | 1/2013 | Arnold ............... G06F 3/04886 715/765 |
| 2013/0047236 | A1* | 2/2013 | Singh .................... H04L 63/08 726/7 |
| 2013/0263240 | A1* | 10/2013 | Moskovitch ......... H04L 63/083 726/7 |
| 2014/0359760 | A1 | 12/2014 | Gupta et al. |
| 2015/0242087 | A1* | 8/2015 | Elangovan et al. .... G06F 9/451 715/773 |
| 2015/0293694 | A1* | 10/2015 | Bozzini et al. ...... G06F 3/0482 715/773 |
| 2015/0381654 | A1 | 12/2015 | Wang et al. |
| 2017/0032113 | A1* | 2/2017 | Tunnell et al. ...... H04L 9/3226 |
| 2017/0329515 | A1* | 11/2017 | Clement et al. ....... G06F 3/011 |
| 2019/0384431 | A1* | 12/2019 | Berger et al. ........ G06F 3/0202 |

\* cited by examiner

FRICTIONLESS AUTHENTICATION FOR LOGGING ON A COMPUTER SERVICE

BACKGROUND OF THE INVENTION

1. Field of the Invention

The present invention relates generally to computer security, and more particularly but not exclusively to login authentication.

2. Description of the Background Art

Users typically have to enter a password to gain access to a computer service, such as online banking, social network, email, and other services accessible over the Internet. To prevent unauthorized access to a user account, computer services typically require the user to choose a strong password. For example, passwords may be required to be at least eight characters long, contain uppercase and lowercase characters, contain special characters, not available in a dictionary, and/or have other restrictions to make the password very difficult to guess. Other computer services even require users to change passwords periodically (e.g., every 180 days). These security measures make passwords very difficult to remember, especially when users have multiple accounts on different computer services.

Some computer services implement a two-step Short Message Service (SMS) authentication, where the computer service sends a verification code by text message to a user's mobile phone. While somewhat effective, two-step SMS authentication is time-consuming, requires the user to always carry a mobile phone, and is vulnerable to mobile phone theft.

Frictionless authentication refers to login authentication that makes it relatively easy for the user to login. One example of frictionless authentication is biometric authentication, where the user's facial feature or fingerprint is used to authenticate the user. Although convenient, biometric authentication requires biometric sensors that, although widely available on mobile phones, are extra equipment to be purchased and require additional software support for most computers. Furthermore, there have been reports of hackers getting around face identification, fingerprint identification, and iris identification to gain unauthorized access to user accounts.

SUMMARY

In one embodiment, a login authentication process to access a computer service includes displaying a virtual keyboard on a display screen of a computer. A user enters a password by clicking on the virtual keyboard. The manner the user clicked on the virtual keyboard to enter the password is compared to the manner an authorized user of the computer service clicked on the virtual keyboard to enter an authorized password during a learning phase. The login authentication is deemed to be a success when the password matches the authorized password, and the manner the user clicked on the virtual keyboard to enter the password matches the manner the authorized user clicked on the virtual keyboard to enter the authorized password.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
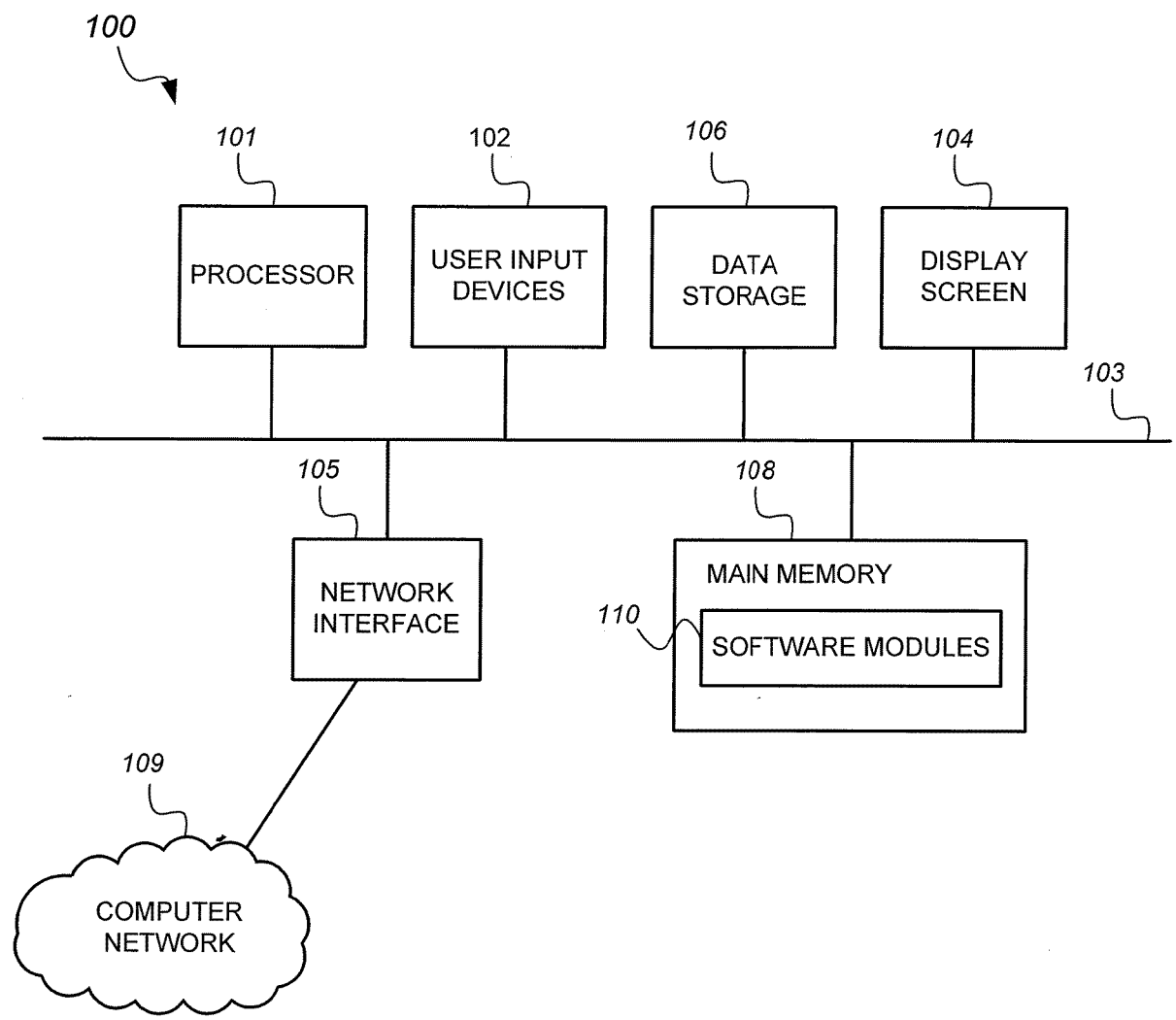
FIG. 1 shows a logical diagram of a computer system that may be employed with embodiments of the present invention.

Referring now to FIG. 1, there is shown a logical diagram of a computer system 100 that may be employed with embodiments of the present invention. The computer system 100 may be employed as a user computer, a server computer, or other computer described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory on the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a user computer, the software modules 110 may comprise a client module for accessing a computer service. In one embodiment where the computer system 100 is configured as a server computer, the software modules 100 may comprise server software for providing a computer service and an authentication module for providing frictionless authentication of users of the computer service.

Figure 2:
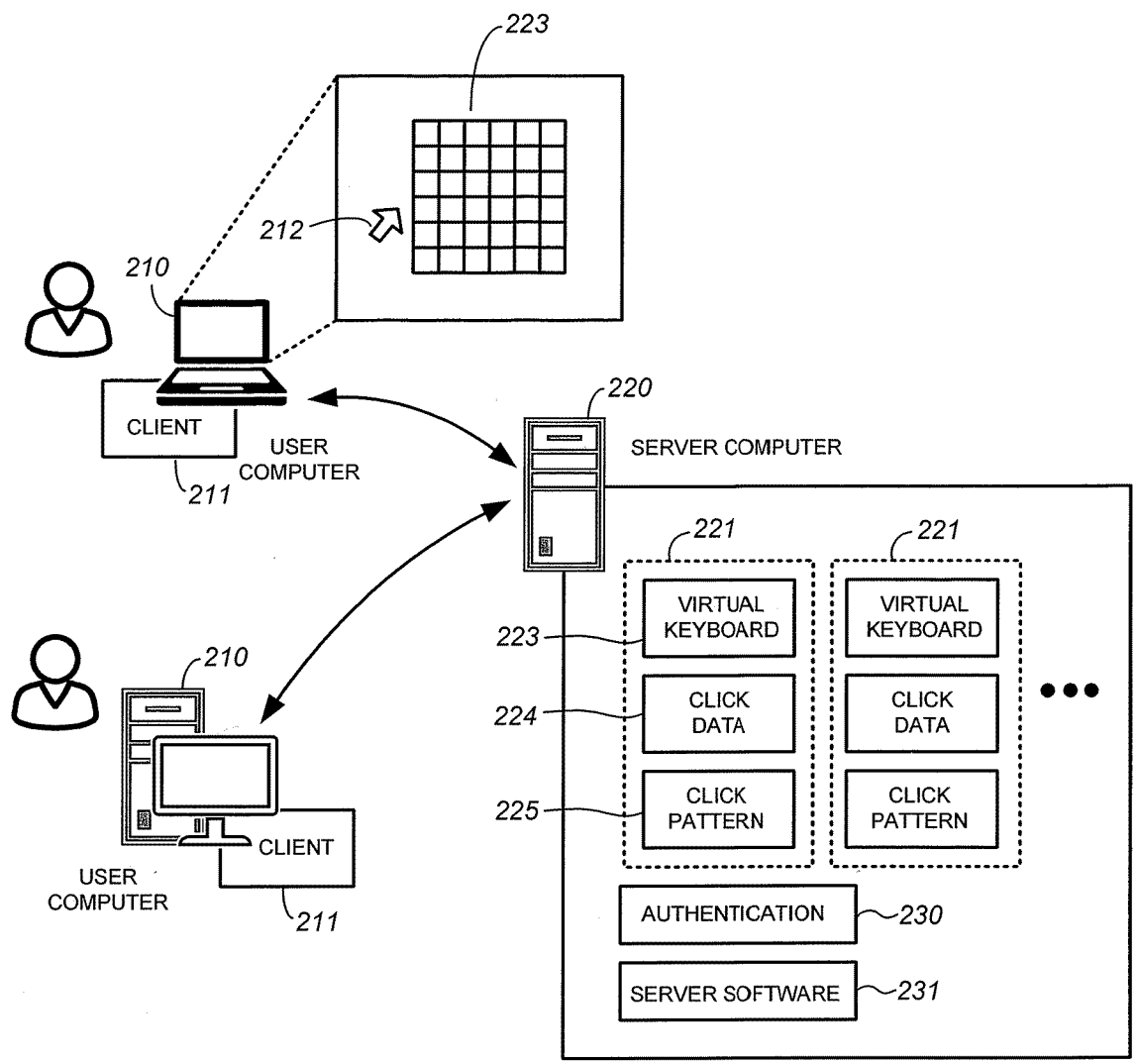
FIG. 2 shows a logical diagram of a system for providing a computer service with frictionless authentication in accordance with an embodiment of the present invention.

FIG. 2 shows a logical diagram of a system for providing a computer service with frictionless authentication in accordance with an embodiment of the present invention. In the example of FIG. 2, the system comprises a server computer 220 and a plurality of user computers 210.

A user computer 210 may comprise a desktop, laptop, or other computing device that a user employs to access a computer service provided by the server computer 220. The user computer 210 may include client software 211 for accessing the computer service provided by the server computer 220 over the Internet. In one embodiment, the client software 211 comprises a web browser, and the client software 211 receives webpages served by the server computer 220.

The server computer 220 may be configured to provide a computer service, such as online banking, social network, email, file storage, online conferencing, or other service that is accessible over the Internet. The server computer 220 may comprise at least one processor and memory, with the memory storing instructions of an authentication module 230 and server software 231. The at least one processor of the server computer 220 may execute the instructions of the server software 231 to cause the server computer 220 to provide the computer service. The at least one processor of the server computer 220 may execute the instructions of the authentication module 230 to perform frictionless authentication as further described below.

In one embodiment, the authentication module 230 is configured to maintain user data 221 for each user of the computer service. User data 221 may include a unique virtual keyboard 223 assigned to a user, click data 224 of the user, and a click pattern 225 of the user. In the example of FIG. 2, the authentication module 230 is configured to display the unique virtual keyboard 223 on a display screen of a user computer 210. The virtual keyboard 223 is "virtual" in that is not a physical keyboard, but an image of a keyboard that is displayed on a display screen. The user may employ a pointer 212 of a mouse, touch screen, or other pointing device (e.g., touchpad, pen/tablet, trackball), to click on a virtual key of the virtual keyboard 223 to select a character for data entry.

"Clicking" refers to pressing on an object displayed on a display screen to select the object, and includes touching the object with a finger as displayed on a touch-sensitive display screen and clicking a button of a pointing device while its pointer is on the object. A user may enter a password to login to his account on the computer service by clicking on virtual keys of the virtual keyboard 223. The user is authenticated to access the computer service based on the password the user entered, and the manner the user entered the password on the virtual keyboard 223, such as the user's password-entry dynamics while entering the password on the virtual keyboard 223.

In one embodiment, a user's password-entry dynamics include interval time and pressing time during password-entry. Interval time is the length of time it takes the user to click on a character (i.e., virtual key corresponding to the character), such as the time between displaying of the virtual keyboard 223 and the user clicking the first character of the password or the time between clicking of adjacent characters of the password. The login authentication is "frictionless" in that the password does not have to be strong, thus allowing for relatively easy login authentication. For example, the password may just be the username of the user or something simple, such as the user's birthdate, street address, and so on. The password does not have to be strong because login authentication is primarily based on the way the user entered the password using the virtual keyboard 223.

The user may be allowed access to the computer service when the password entered by the user matches an authorized password entered by an authorized user on the virtual keyboard 223 during a learning phase, and when the manner the user entered the password on the virtual keyboard matches the manner the authorized user entered the authorized password on the virtual keyboard 223 during the learning phase. While an exact match may be required for the password, some level of deviation may be allowed to establish a match for the manner the user entered the password. The deviation may be adjusted to meet acceptable false positives/false negatives rates.

In one embodiment, the authentication module 230 is configured to assign a unique virtual keyboard 223 for each user. For example, the character layout of the virtual keyboard 223 may be randomly generated for each user. More particularly, one user may have a virtual key for the character "A" in one location of the virtual keyboard 223, and another user may have the virtual key for the character "A" in another location of the virtual keyboard 223. By having different character layouts for each user, different users would have different password-entry dynamics. That is, one user may take 2 seconds between clicking of characters "A" and "B", and another user may take 5 seconds between clicking of characters "A" and "B" because the locations of the virtual keys for "A" and "B" may be different for each user. Also, because of physical and physiological differences between users, the interval times and pressing and times are expected to be different for different users. The authentication module 230 may include an initial learning phase during which the authentication module 230 learns the way an authorized user enters an authorized password on a virtual keyboard 223, and a login authentication phase during which a user is authenticated by having the user enter a password on the virtual keyboard 223.

In one embodiment, during the initial learning phase, the authentication module 230 prompts a user to enter a password on a virtual keyboard 223. As the user clicks characters (i.e., virtual keys of corresponding characters) of the password on the virtual keyboard 223, the authentication module 230 collects the interval times, pressing times, and the clicking sequence made by the user to enter the password. By prompting the user to enter the password several times, sufficient click data 224 of interval times and pressing times are collected.

The authentication module 225 may determine, from the click data 224, a click pattern 225 that indicates interval times to the first character and between characters, pressing time on each character, and the clicking sequence of the password as entered by the user. A suitable clustering algorithm may be employed on the click data 224 to generate the click pattern 225. Example clustering algorithms that may be employed include the LR clustering algorithm and GBDT+LR clustering algorithm. Other suitable clustering algorithms may also be employed without detracting from the merits of the present invention. In one embodiment, a click pattern 225 may include:

(a) Interval time and clicking sequence;
(b) Pressing time and clicking sequence; or
(c) Interval time, pressing time, and clicking sequence.

The user who entered the password on the virtual keyboard 223 during the learning phase is also referred to herein as an "authorized user" of the computer service, and the password entered by the user during the learning phase is also referred to herein as an "authorized password."

In the application phase, a user attempting to login to the computer service is authenticated to ensure that the user is an authorized user of the computer service. In one embodiment, during the application phase, the server software 231 serves a webpage that displays the virtual keyboard 223 that has been assigned to the user. For example, the virtual keyboard 223 may be drawn using the Hypertext Markup Language (HTML) Document Object Model (DOM), with a <div> element being employed for each character. In that example, the CSS language may be used to control the character layout of the virtual keyboard 223. Each character of the virtual keyboard 223 may be an element of HTML DOM that binds mouse up and down events by JavaScript to get the interval times and pressing times. As another example, for Microsoft Windows applications, the virtual keyboard 223 may be implemented by drawing the virtual keyboard 223 using the Microsoft .NET Framework, using the button element for each character, and binding mouse up and down events on each button.

During the login authentication phase, the user enters his password by clicking on corresponding characters on the virtual keyboard 223 to generate entered click data, which comprise interval times, pressing times, and the clicking sequence. If the interval times, pressing times, and clicking sequence match those indicated in the click pattern 225 of the user, the login authentication is deemed to be a success and the user is allowed to access the computer service. Otherwise, when the entered click data do not match the click pattern 225 of the user, the login authentication is deemed to be a failure and the user is blocked from accessing the computer service. In the event of a failed login authentication, the user may be provided additional options, in case the user simply forgot his password, such by resetting the password using a preregistered email, answering predetermined security questions, or other conventional ways of regaining access to a computer service.

Figures 3, 4:
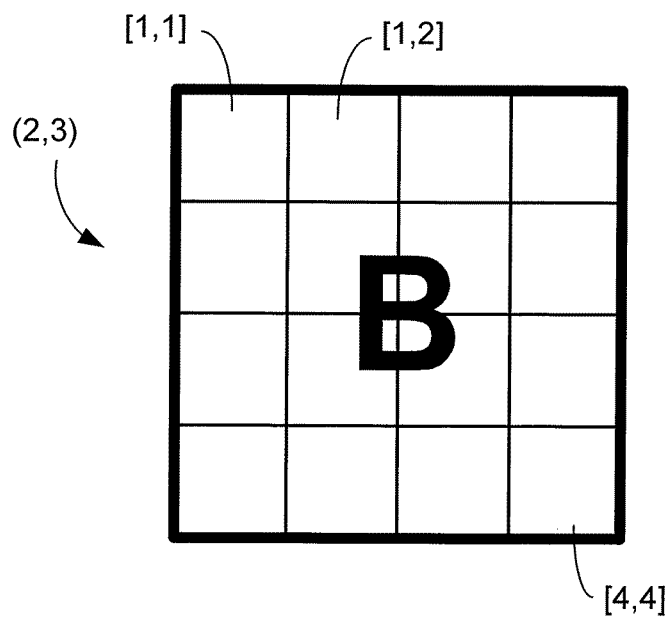
FIG. 3 shows an example virtual keyboard in accordance with an embodiment of the present invention.
FIG. 4 shows a character data array of a virtual key of a virtual keyboard in accordance with an embodiment of the present invention.

FIG. 3 shows an example virtual keyboard in accordance with an embodiment of the present invention. In the example of FIG. 3, a virtual keyboard 223-1 is a particular embodiment of a virtual keyboard 223. It is to be noted that the character layout of the virtual keyboard 223-1 shown in FIG. 3 is for illustration purposes only. Generally speaking, the character layout of a virtual keyboard 223 will vary per user.

In the example of FIG. 3, the virtual keyboard 223-1 has virtual keys for characters A-Z and 0-9, giving a total of 36 characters. The virtual keyboard 223-1 is represented as an array of virtual keys that are arranged in "(ROW, COLUMN)" format. In the example of FIG. 3, the virtual key for the character "A" is in row 1, column 1 or location (1, 1) of the virtual keyboard 223-1, and the virtual key for the character "S" is in row 6, column 6 or location (6,6) of the virtual keyboard 223-1. Similarly, the virtual key for the character "B" is in location (2, 3), the virtual key for the character "N" is in location (1, 6), and the virtual key for the character "W" is in location (6, 1) of the virtual keyboard 223-1.

In one embodiment, each virtual key may be represented as an array of character data, with the character data representing time data for the character. The character data may indicate interval time or pressing time. This feature of the present invention is illustrated in FIG. 4, which shows a character data array of a virtual key in location (2,3) (i.e., character "B") of the virtual keyboard 223-1 of FIG. 3. In the example of FIG. 4, a virtual key has an array of character data in "[ROW, COLUMN]" format. With a 4×4 array of character data for each character, a password with up to 16 characters is supported. As can be appreciated, the size of the character data array may be adjusted to accommodate different password lengths. The contents of character data arrays are shown below as being visible on the virtual keyboard 223 for ease of illustration. The contents of character data arrays are stored in memory, and are typically hidden from the user.

In the example of FIG. 4, the character data for row 1, column 1 or [1, 1] is on the upper left corner and the character data for row 4, column 4 or [4, 4] is on the lower right corner. The character data for each character may be stored in corresponding locations from left to right, top to bottom as time data for the character is detected. For example, the character data for location [1, 1] may indicate the interval time to clicking the character "B" the first time, the character data for location [1, 2] may indicate the interval time to clicking the character "B" the second time, and so on. As another example, the character data for location [1, 1] may indicate how long the user pressed (i.e., pressing time) on the character "B" the first time the character "B" is clicked, the character data for location [1, 2] may indicate how long the user pressed on the character "B" the second time the character "B" is clicked, and so on. As can be appreciated, the array of character data may be stored as a data structure or other format in memory.

Figure 5:
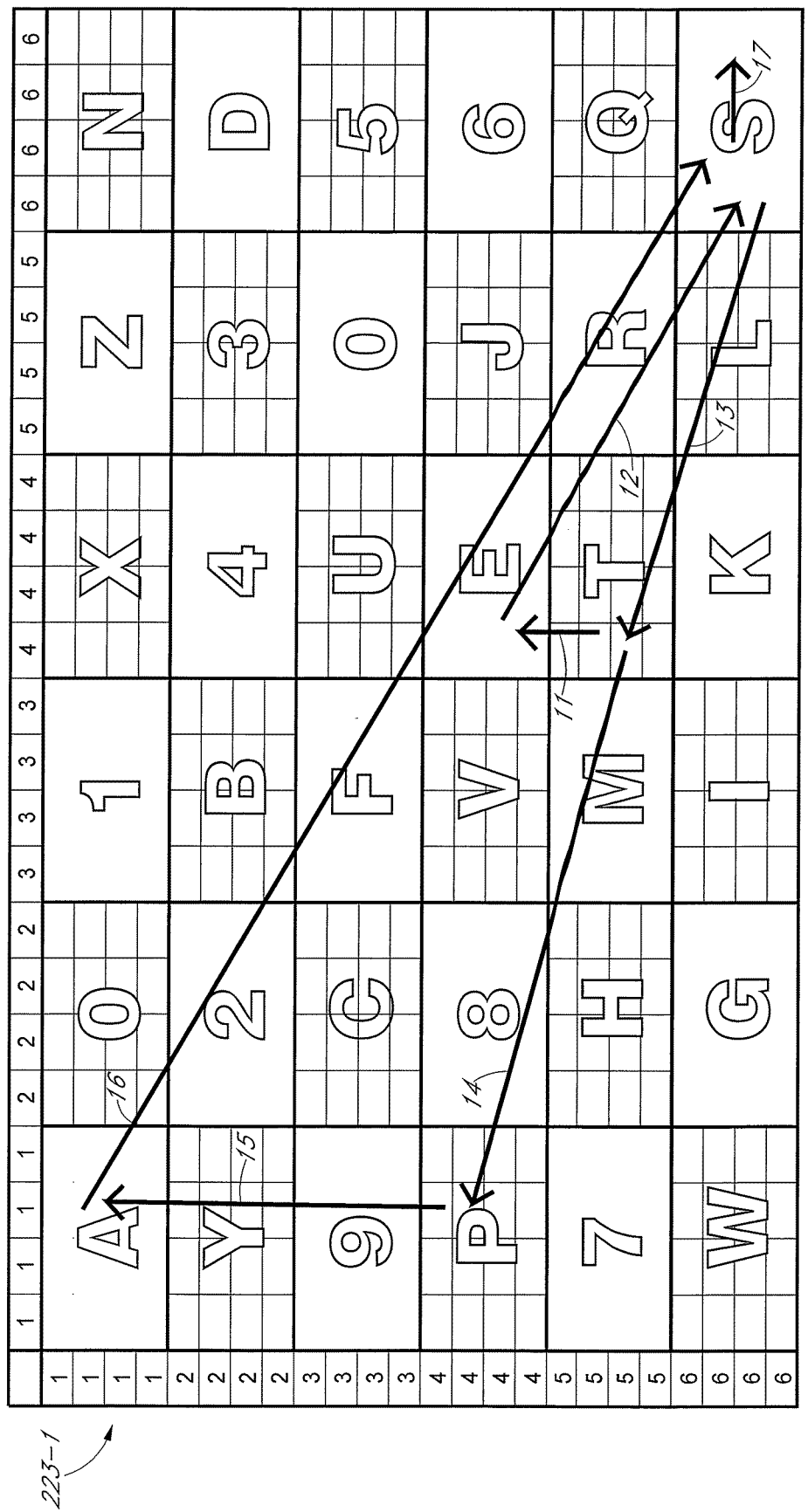
FIG. 5 shows a graphical illustration of entering characters of a password on a virtual keyboard in accordance with an embodiment of the present invention.

FIG. 5 shows a graphical illustration of entering characters of a password on a virtual keyboard in accordance with an embodiment of the present invention. In the example of FIG. 5, the password is "TESTPASS", which is the username of the user. The user enters "TESTPASS" on the virtual keyboard 223-1. As can be appreciated, having the username as a password is extremely easy to remember and is substantially equivalent to having no password. It is the same as using "Guest" as a password to a "Guest" account. When presented with the virtual keyboard 223-1, the user enters the password by clicking on the character "T", character "E" (see arrow 11), character "S" (see arrow 12), character "T" (see arrow 13), character "P" (see arrow 14), character "A" (see arrow 15), character "S" (see arrow 16), and character "S" (see arrow 17), in that sequential order. The clicking sequence of entering the password may be represented in the form:

(ROW, COLUMN, ORDER)

where ROW and COLUMN indicate the location of the character on the virtual keyboard and ORDER indicates the number of times the character has been clicked (e.g., ORDER = 0 means the character has not been clicked, ORDER = 1 means the character is clicked the first time, ORDER = 2 means the character is clicked the second time. Using the example of FIG. 5 as an example, the password "TESTPASS" may be represented by the clicking sequence: (5,4,1), (4,4,1), (6,6,1), (5,4,2), (4,1,1), (1,1,1), (6,6,2), (6,6,3), where (5,4,1) indicates that the character "T" (at location (5, 4)) is clicked the first time, (4,4,1) indicates that the character "E" (at location (4, 4)) is clicked the first time, (6,6,1) indicates that the character "S" (at location (6, 6)) is clicked the first time, (5,4,2) indicates that the character "T" is clicked the second time, and so on.

Figure 6:
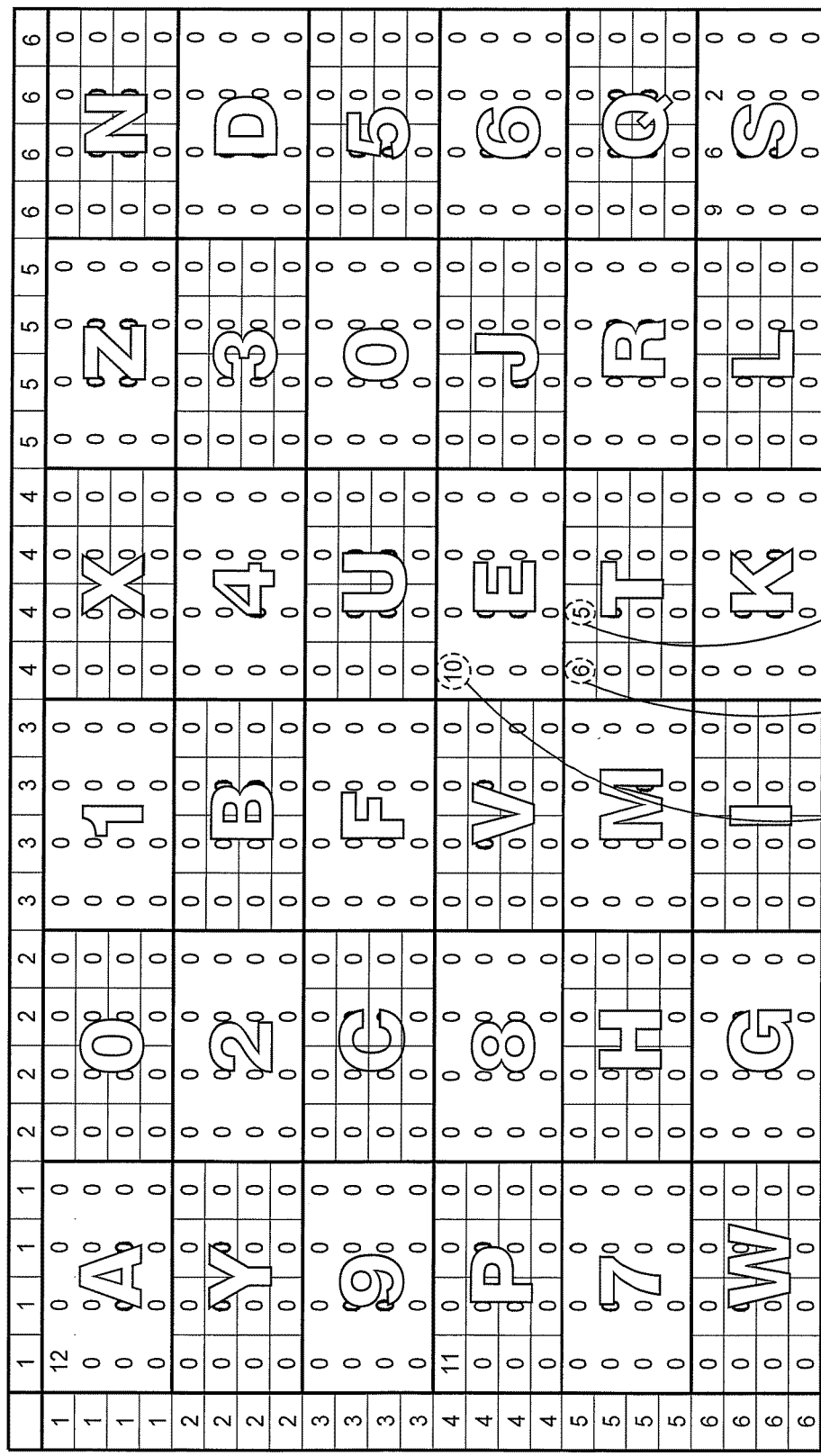
FIG. 6 shows a graphical illustration of representing interval times in a character data array in accordance with an embodiment of the present invention.

FIG. 6 shows a graphical illustration of representing interval times in a character data array in accordance with an embodiment of the present invention. The interval time may be from when a virtual keyboard is displayed up to the clicking of the first character of the password, or time between clicking of adjacent characters of the password. In the example of FIG. 6, the password "TESTPASS", which is the username of the user, is entered by the user on the virtual keyboard 223-1.

An interval time may be represented in seconds or some other unit of time. In the example of FIG. 6, the character data at location [1, 1] of the character "T" indicates an interval time of 6 seconds (see circle 252) the first time the user clicked on the character "T", the character data at location [1, 2] of the character "T" indicates an interval time of 5 seconds (see circle 253) the second time the user clicked on the character "T", the character data at location [1, 1] of the character "E" indicates an interval time of 10 seconds (see circle 251) the first time the user clicked on the character "E", and so on. Note that character data at location [1, 1] of the character "T" in the example of FIG. 6 is the interval time from when the virtual keyboard 223-1 is displayed up to the first time the character "T" is pressed.

Figure 7:
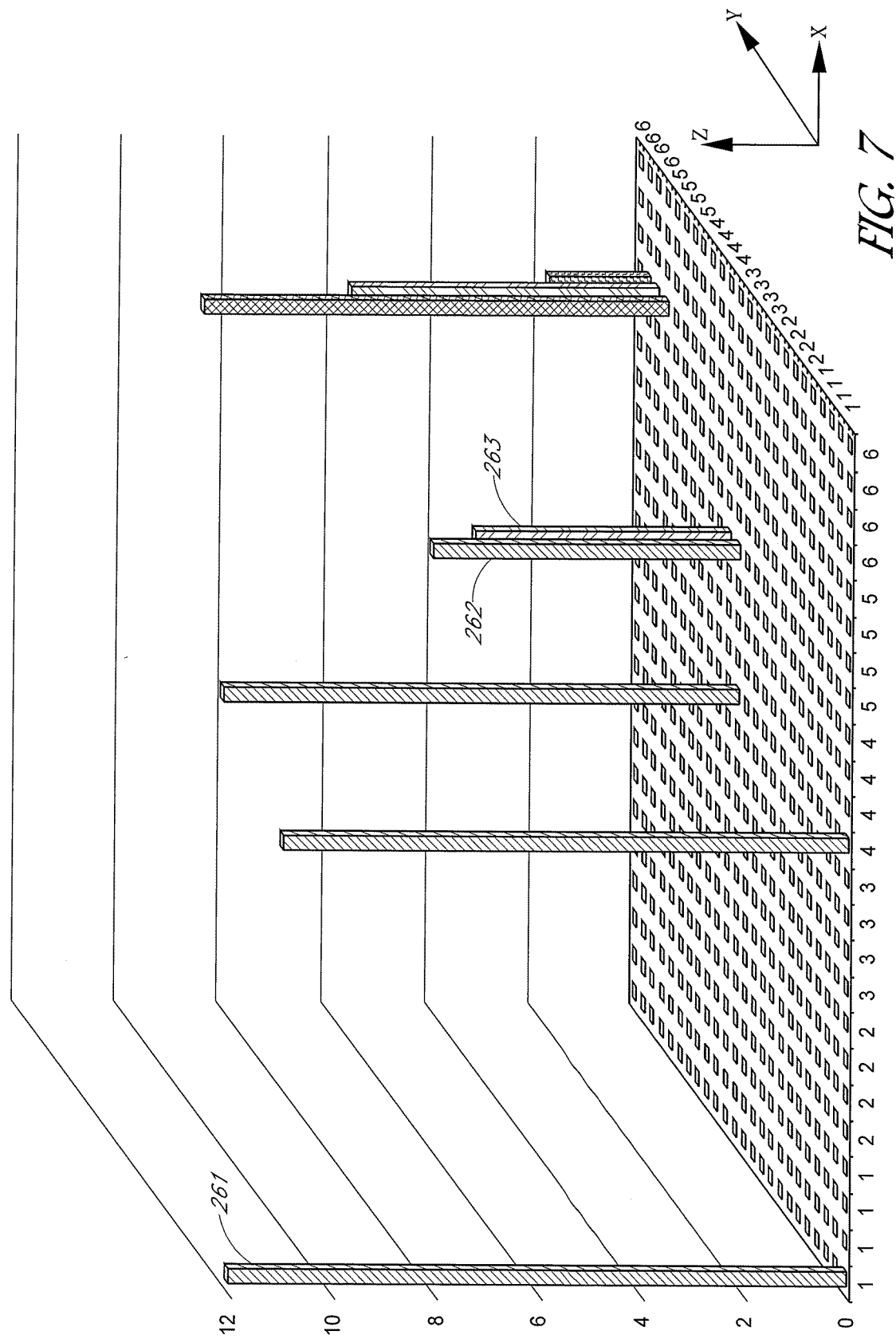
FIG. 7 shows plots of interval times for a password entered using a virtual keyboard in accordance with an embodiment of the present invention.

The interval times for "TESTPASS" in the example of FIG. 6 is: 6, 10, 9, 5, 11, 12, 6, and 2, which are visualized in FIG. 7. In the example of FIG. 7, the X-axis represents row, the Y-axis represents column, and the Z-axis represents interval time. In the example of FIG. 7, the bar graph 261 represents the interval time for the character "A", the bar graph 262 represents the interval time for the first clicking of the character "T", the bar graph 263 represents the interval time for the second clicking of the character "T", and so on.

Figure 8:
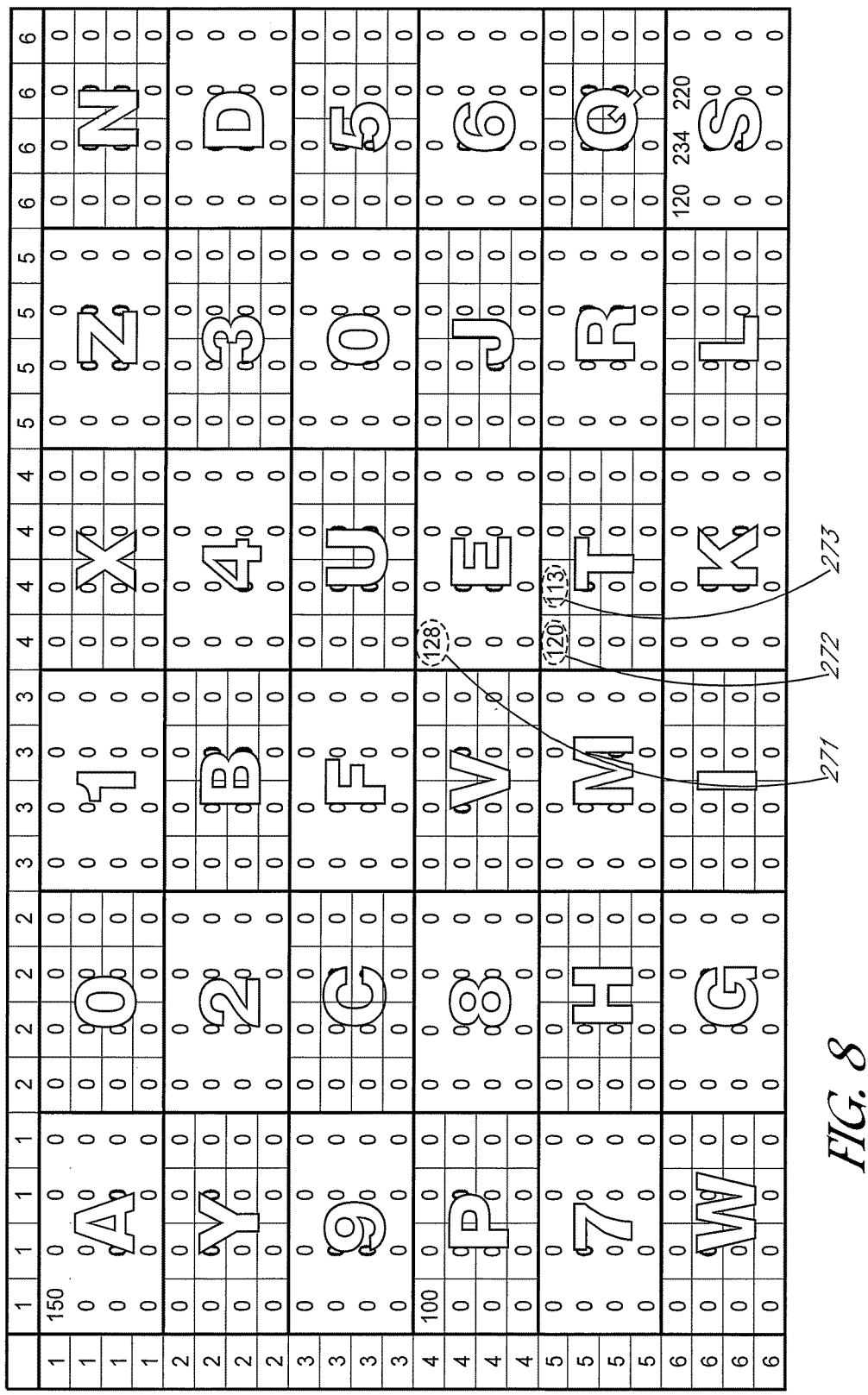
FIG. 8 shows a graphical illustration of representing pressing times in a character data array in accordance with an embodiment of the present invention.

FIG. 8 shows a graphical illustration of representing pressing times in a character data array in accordance with an embodiment of the present invention. In the example of FIG. 8, the password "TESTPASS", which is the username of the user, is entered by the user on the virtual keyboard 223-1 as previously discussed.

A pressing time may be represented in milliseconds or some other unit of time. In the example of FIG. 8, the character data at location [1, 1] of the character "T" indicates a pressing time of 120 milliseconds the first time the user clicked on the character "T", i.e., the user clicked and held on the virtual key of the character "T" for 120 milliseconds (see circle 272). Continuing the example of FIG. 8, the character data at location [1, 2] of the character "T" indicates a pressing time of 113 milliseconds (see circle 273) the second time the user clicked on the character "T", the character data at location [1, 1] of the character "E" indicates a pressing time of 128 milliseconds (see circle 271) the first time the user clicked on the character "E", and so on.

Figure 9:
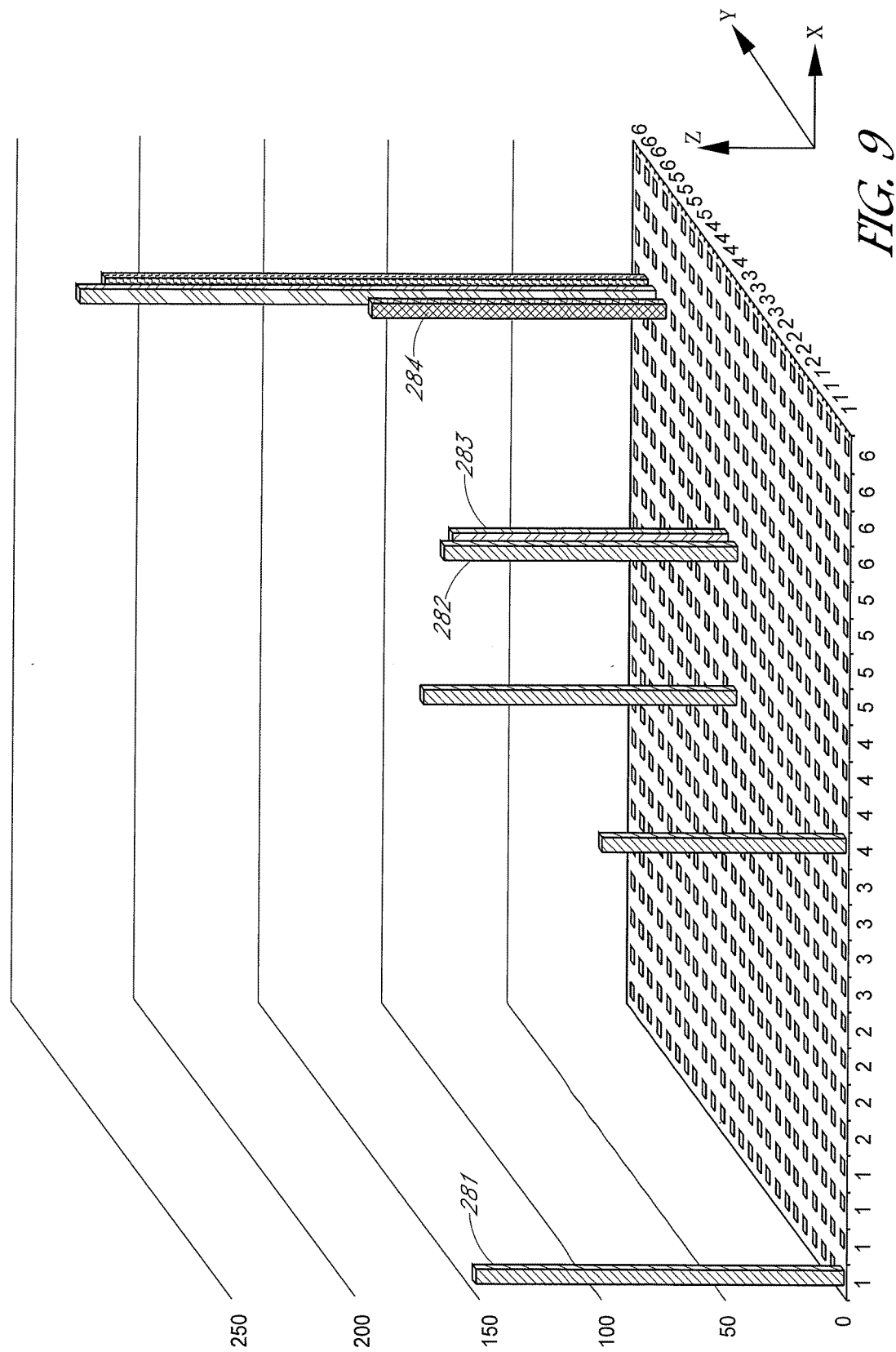
FIG. 9 shows plots of pressing times for a password entered using a virtual keyboard in accordance with an embodiment of the present invention.

The pressing times for "TESTPASS" in the example of FIG. 8 are: 120, 128, 120, 113, 100, 150, 234, and 220, which are visualized in FIG. 9. In the example of FIG. 9, the X-axis represents row, the Y-axis represents column, and the Z-axis represents pressing time. In the example of FIG. 9, the bar graph 281 represents the pressing time for the character "A", the bar graph 282 represents the pressing time for the first clicking of the character "T", the bar graph 283 represents the pressing time for the second clicking of the character "T", and so on.

Instead of a username, a user may choose a simple password that is very easy to remember. Using a simple password adds some level of security, as a hacker has to know the simple password in addition to entering the simple password on the virtual keyboard in the same manner as the user.

Figure 10:
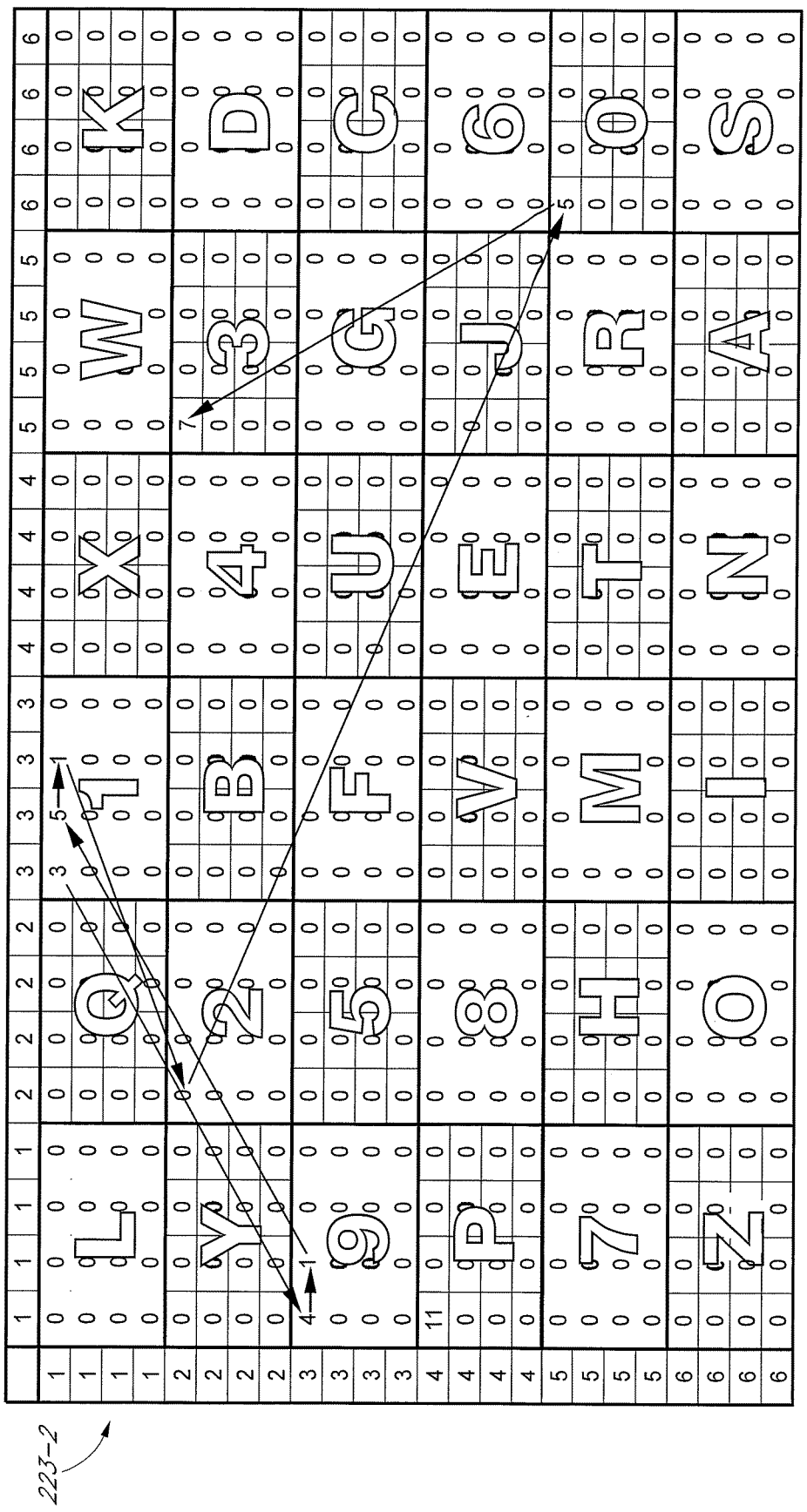
FIG. 10 shows an example virtual keyboard in accordance with an embodiment of the present invention.

FIG. 10 shows shows an example virtual keyboard in accordance with an embodiment of the present invention. In the example of FIG. 10, a virtual keyboard 223-2 is a particular embodiment of a virtual keyboard 223. It is to be noted that the character layout of the virtual keyboard 223-2 shown in FIG. 10 is for illustration purposes only. Generally speaking, the character layout of a virtual keyboard 223 will vary per user.

Figure 11:
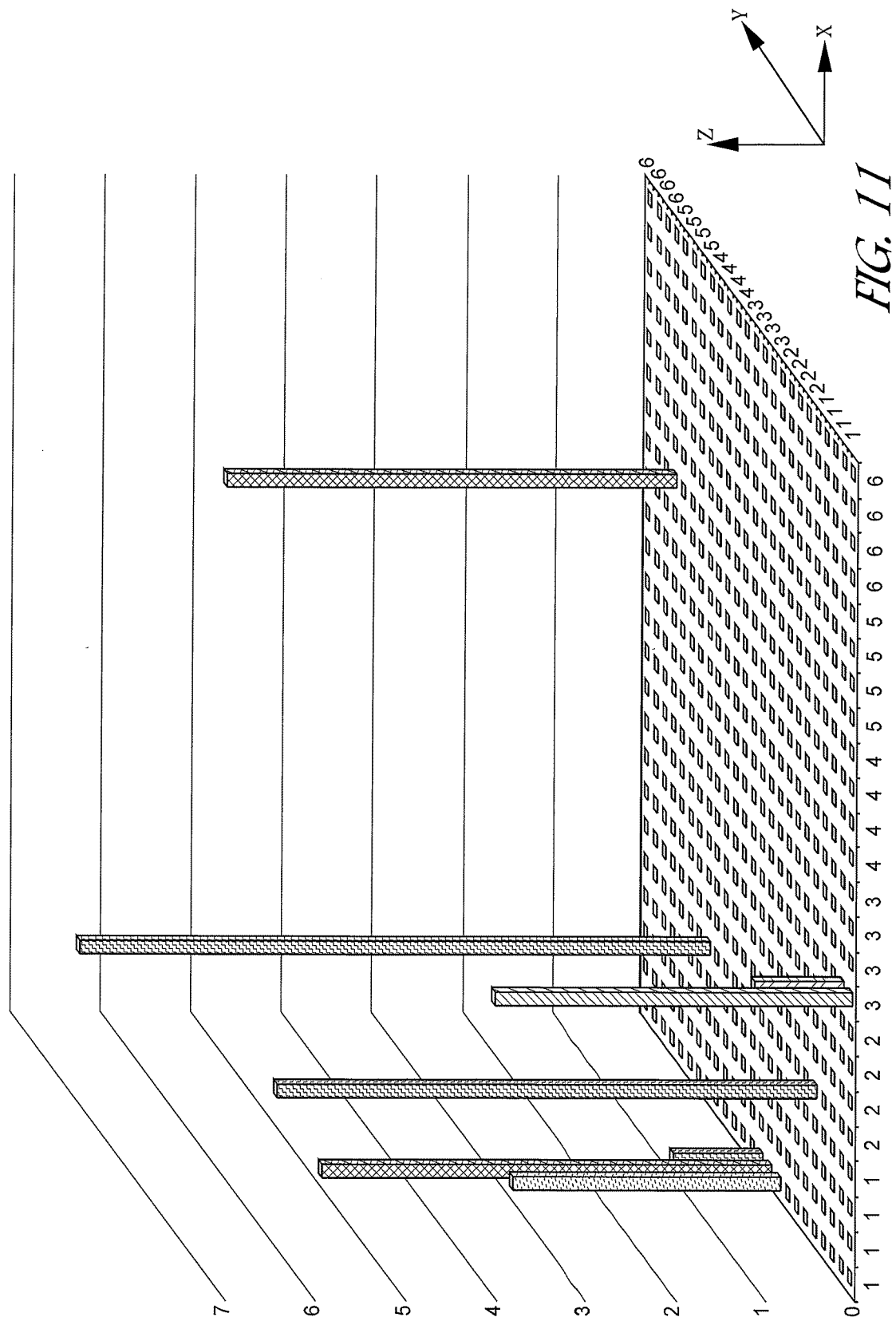
FIG. 11 shows plots of interval times for a password entered using the virtual keyboard of FIG. 10 in accordance with an embodiment of the present invention.

In the example of FIG. 10, the user chooses to have a simple password that is easy for the user to remember. The password in the example of FIG. 10 is "19911203", which is the date of birth of the user, i.e., Dec. 03, 1991 in the format YEAR/MONTH/DAY. The arrows in FIG. 10 shows the clicking sequence to enter the simple password, and the character data array for each character show interval times as the user enters the simple password. The interval times for the example of FIG. 10 are visualized in FIG. 11. In the example of FIG. 11, the X-axis represents row, the Y-axis represents column, and the Z-axis represents interval time.

Figure 12:
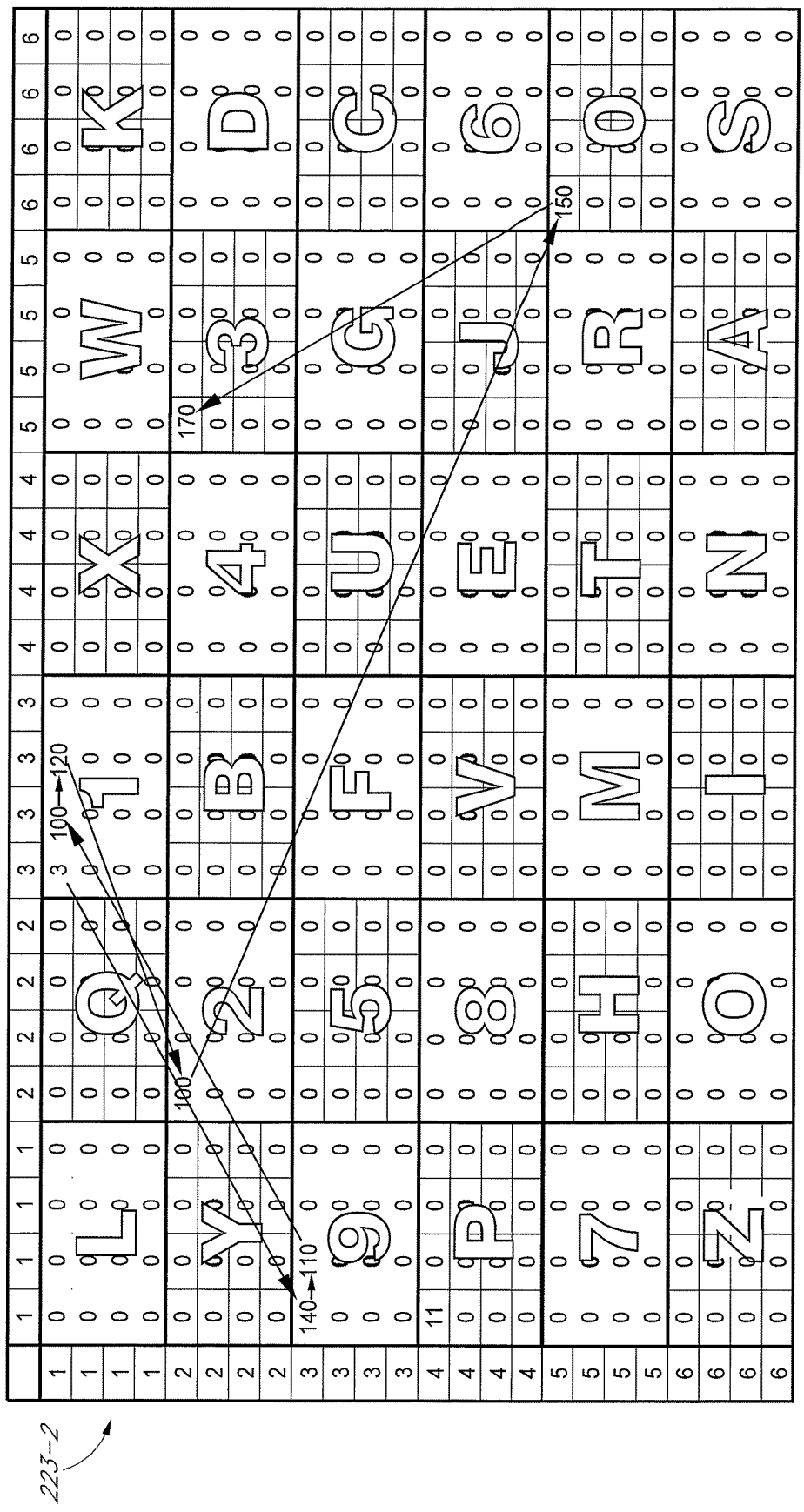
FIG. 12 shows the virtual keyboard of FIG. 10, along with pressing times and clicking sequence, in accordance with an embodiment of the present invention.
Figure 13:
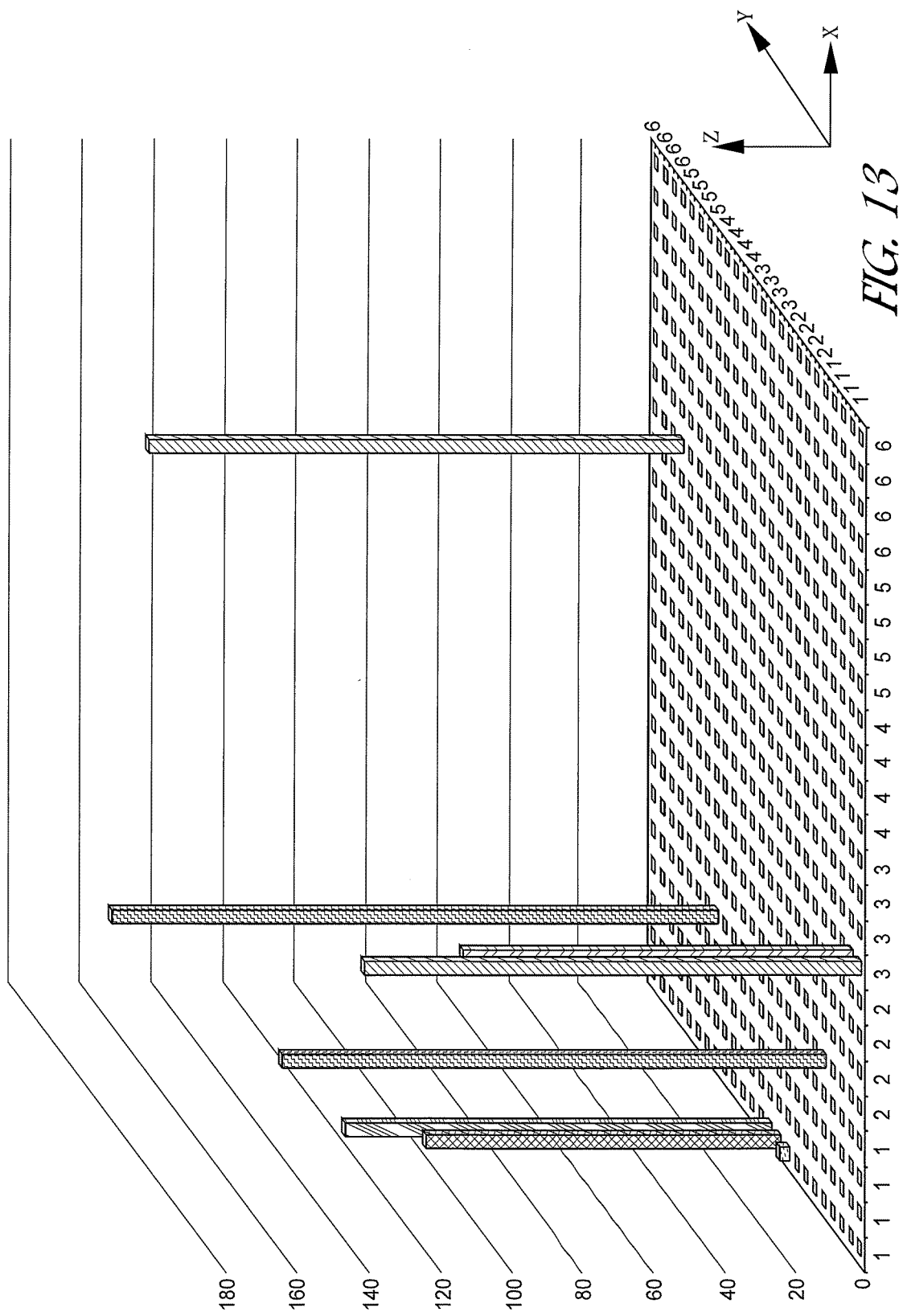
FIG. 13 shows plots of the pressing times of FIG. 12.

FIG. 12 shows the clicking sequence to enter the simple password (i.e., "19911203") using the virtual keyboard 223-2, with the character data array indicating the pressing time for each character. The pressing times for the example of FIG. 12 are visualized in FIG. 13. In the example of FIG. 13, the X-axis represents row, the Y-axis represents column, and the Z-axis represents pressing time.

Figure 14:
FIG. 14 shows an example three-dimensional virtual keyboard.

As can be appreciated, the design and layout of a virtual keyboard 223 may vary depending on the application. A virtual keyboard 223 does not have to be rectangular or two-dimensional. For example, a virtual keyboard 223 may be three-dimensional. This is illustrated in FIG. 14, where a virtual keyboard 223-3 is spherical. A user may rotate the virtual keyboard 223-3, as rendered on the display screen, using drag and drop mouse movements, for example. The drag and drop times and directions may be included as part of the user's click pattern 225.

Figure 15:
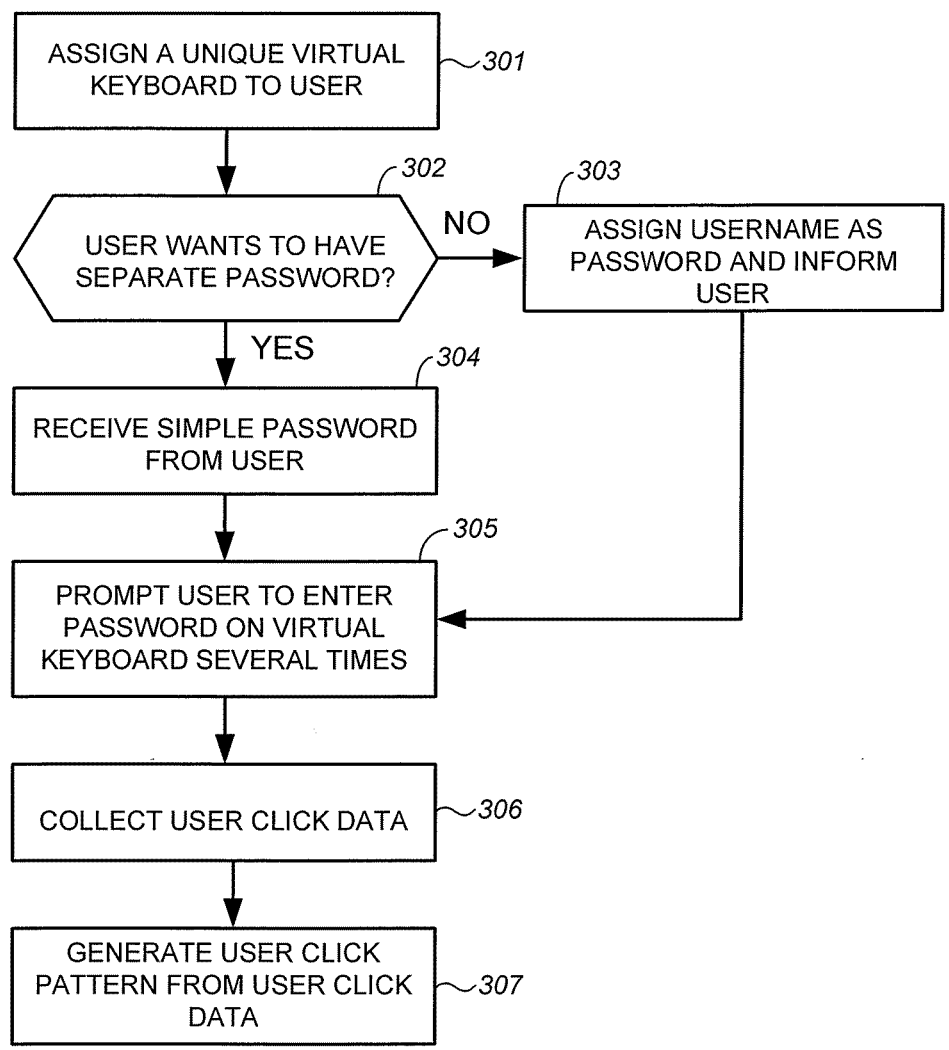
FIG. 15 shows a flow diagram of a method of generating a click pattern for login authentication to access a computer service in accordance with an embodiment of the present invention.

FIG. 15 shows a flow diagram of a method of generating a click pattern for login authentication to access a computer service in accordance with an embodiment of the present invention. The method of FIG. 15 is explained using previously described components. As can be appreciated, other components may also be used without detracting from the merits of the present invention. More particularly, the method of FIG. 15 may be implemented by the server computer 220 as configured with the authentication module 230 during a learning phase of a frictionless login authentication process.

In the example of FIG. 15, the server computer 220 assigns a unique virtual keyboard 223 to a user of a computer service (step 301). The virtual keyboard 223 is unique in that other users of the computer service will be assigned virtual keyboards with different character layouts. In one embodiment, the server computer 220 generates a plurality of virtual keyboards 223 with randomly assigned character layouts. Each user of the computer service is assigned a unique virtual keyboard 223 from the plurality of virtual keyboards 223. The plurality of virtual keyboards 223 may have two-dimensional or three dimensional character layouts, for example.

The computer service may require the user to enter a username and a password to login. During the learning phase of the login authentication process, the server computer 220 asks the user whether or not the user wants to have a password (step 302). The server computer 220 assigns the username of the user as the user's password when the user does not want to have a password (step 302 to step 303). When the user wants to have a password, the server computer 220 receives a password from the user (step 302 to step 304). Advantageously, the password may be a simple password, because the login authentication process is not reliant on the strength of the password itself.

The server computer 220 serves the assigned virtual keyboard 223 to the user computer 210 of the user, and prompts the user to enter his password (either username or simple password in this example) on the virtual keyboard 223 several times (e.g., 5 or more times) (step 305). The server computer 220 collects clicking data 224 as the user enters the password (step 306). The clicking data 224 of the user may comprise interval times, pressing times, and clicking sequence. The clicking data 224 may have more or fewer password-entry dynamics of the user depending on the virtual keyboard 223. For example, the clicking data 224 may include drag and drop times and directions when the virtual keyboard is a three-dimensional virtual keyboard.

The server computer 220 generates a click pattern 225 of the user from the user's clicking data 224 (step 307). For example, the server computer 220 may perform clustering, or other suitable algorithm, on the clicking data 224 to find password-entry dynamics that most fit the clicking data 224. The click pattern 225 may include interval times, pressing times, drag and drop times/direction, etc. that are most indicative of the manner the user enters the password on the virtual keyboard 223. The server computer 220 associates the user's click pattern 225, virtual keyboard 223, and password by username.

Figure 16:
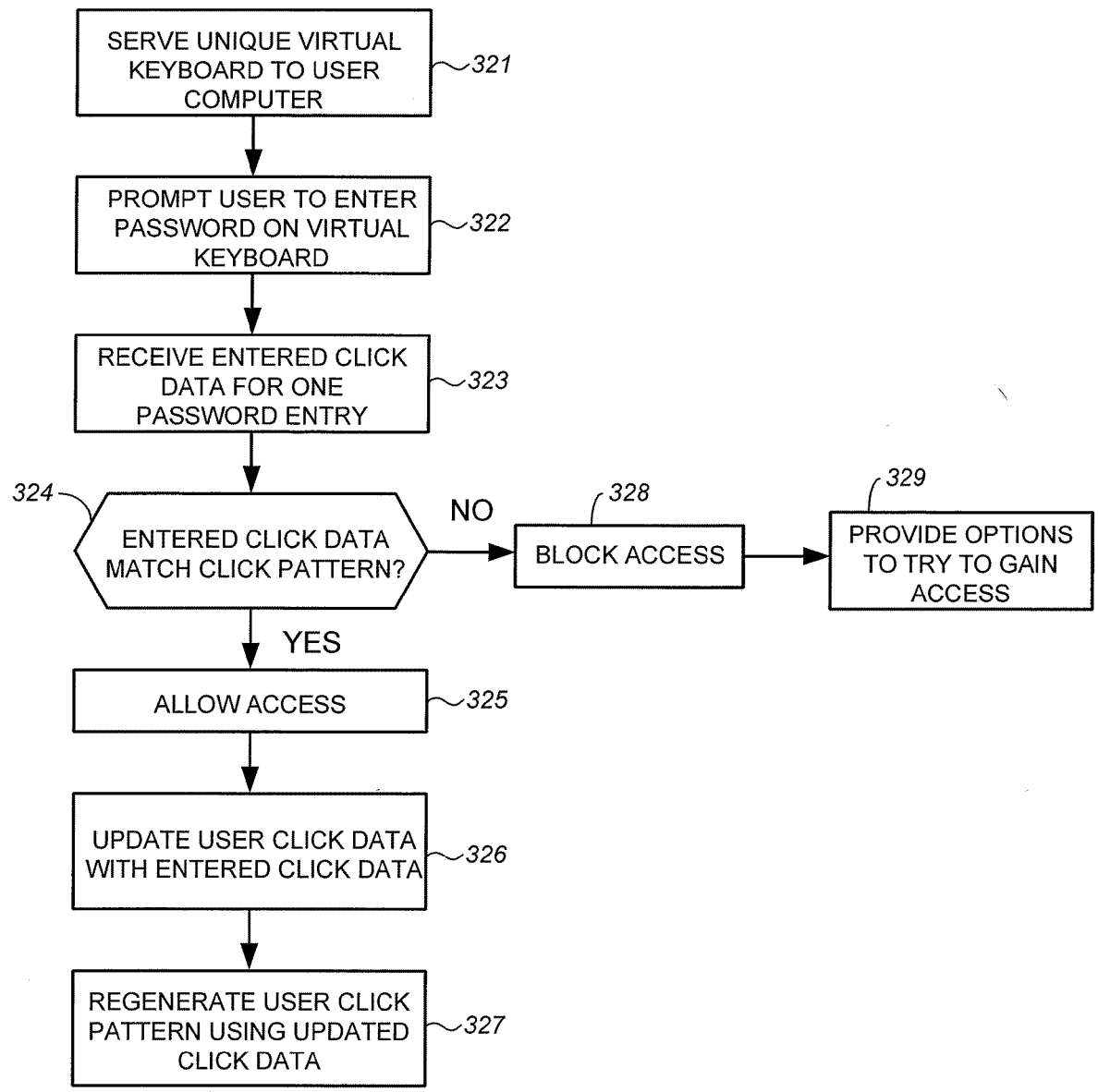
FIG. 16 shows a flow diagram of a method of authenticating a user of a computer service in accordance with an embodiment of the present invention.

FIG. 16 shows a flow diagram of a method of authenticating a user of a computer service in accordance with an embodiment of the present invention. The method of FIG. 16 is explained using previously described components. As can be appreciated, other components may also be used without detracting from the merits of the present invention. More particularly, the method of FIG. 16 may be implemented by the server computer 220 as configured with the authentication module 230 during the application phase of a frictionless login authentication process.

In the example of FIG. 16, the server computer 220 serves a unique virtual keyboard 223 to a user computer 210 of the user (step 321). For example, the server computer 220 may serve the user computer 210 a webpage that prompts the user for a username, then provide a virtual keyboard 223 associated with the username. The user computer 210 may receive the webpage in the process of the user accessing a computer service provided by the server computer 220. The user is prompted to enter a password using the virtual keyboard 223, which is displayed on a display screen of the user computer 210 (step 322). The server computer 220 receives entered click data as the user enters his password one time (step 323), with the entered click data comprising interval times, pressing times, and clicking sequence, and/or other password-entry dynamics indicated in the click pattern 225. The server computer 220 compares the entered click data to the click pattern 225 of the user, which was established during the learning phase (step 324). The comparison between the entered click data and the click pattern 225 may allow for some level of deviation in time units. For example, when comparing interval times and/or pressing times between the entered click data and the click pattern 225, a deviation of plus or minus a predetermined amount of time may be allowed to obtain a match.

When the entered click data match the click pattern 225, the user may be allowed access to the computer service (step 324 to step 325). In that case, the click data 224 of the user collected during the learning phase may be updated with the entered click data (step 326), and the click pattern 225 may be regenerated using the updated click data 224 (step 327).

When the entered click data do not match the click pattern 225, the user may be blocked from accessing the computer service (step 324 to step 328). In that case, the user may be provided one or more options to try to gain access to the computer service (step 329), to cover situations where the user forgot his password or has an impaired physical condition that changes the user's password-entry dynamics. The options may include conventional password-recovery methods, such as requiring the user to answer difficult and predetermined security questions, requiring the user to contact a live representative of the computer service, texting a temporary access code to the user's mobile phone, etc.

Systems and methods for providing frictionless authentication for computer services have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of login authentication for accessing a computer service, the method comprising:

measuring a first time period as an authorized user of the computer service clicks on virtual keys of a virtual keyboard to enter a first sequence of characters, the virtual keyboard being uniquely assigned by the computer service to the authorized user such that locations of characters in a character array of the virtual keyboard are unique relative to locations of characters in character arrays of other virtual keyboards assigned by the computer service to other authorized users of the computer service;

after measuring the first time period, providing the virtual keyboard to a computer of a user and measuring a second time period as the user clicks on the virtual keys of the virtual keyboard to enter a second sequence of characters;

comparing the first time period to the second time period;

comparing the first sequence of characters to the second sequence of characters; and allowing the user to access the computer service based on a result of the comparison of the first time period to the second time period and the comparison of the first sequence of characters to the second sequence of characters.

2. The method of claim 1, wherein the first time period is measured from when the virtual keyboard is displayed up to when the authorized user clicked on a virtual key of a first character of the first sequence of characters, and the second time period is measured from when the virtual keyboard is displayed up to when the user clicked on a virtual key of a first character of the second sequence of characters.

3. The method of claim 1, wherein the first time period is an interval time between clicking of virtual keys of adjacent two characters of the first sequence of characters and the second time period is an interval time between clicking of virtual keys of adjacent two characters of the second sequence of characters.

4. The method of claim 1, wherein the first time period indicates how long the authorized user pressed on a virtual key of a character of the first sequence of characters, and the second time period indicates how long the user pressed on a virtual key of a character of the second sequence of characters.

5. The method of claim 1, wherein the first sequence of characters form a username of the authorized user.

6. The method of claim 1, wherein the first time period indicates how long the authorized user dragged the virtual keyboard to position a virtual key of a character of the first sequence of characters, and the second time period indicates how long the user dragged the virtual keyboard to position a virtual key of a character of the second sequence of characters.

7. The method of claim 1, wherein the user clicked on the virtual keys of the virtual keyboard using a computer mouse.

8. A system comprising:
a server computer comprising at least one processor and memory, the memory storing instructions that when executed by the at least one processor cause the server computer to:
provide a virtual keyboard to a computer of a user who is logging to a computer service;
receive, from the computer of the user, an indication of a manner the user clicked on virtual keys of the virtual keyboard to enter a password;
compare the manner the user clicked on the virtual keys of the virtual keyboard to enter the password to a manner an authorized user of the computer service clicked on the virtual keys of the virtual keyboard to enter an authorized password during a learning phase, the virtual keyboard being uniquely assigned by the computer service to the authorized user such that locations of characters in a character array of the virtual keyboard are unique relative to locations of characters in character arrays of other virtual keyboards assigned by the computer service to other authorized users of the computer service;
compare the password to the authorized password; and
authenticate login of the user to the computer service based on a result of the comparison of the password to the authorized password, and based on a result of the comparison of the manner the user clicked on the virtual keys of the virtual keyboard to enter the password to the manner the authorized user of the computer service clicked on the virtual keys of the virtual keyboard to enter the authorized password.

9. The system of claim 8, further comprising:
the computer of the user comprising at least one processor and memory, the memory of the computer of the user storing instructions that when executed by the at least one processor of the computer of the user cause the computer of the user to:
receive the virtual keyboard from the server computer;
monitor the manner the user clicked on the virtual keys of the virtual keyboard to enter the password to detect click data of the user; and
provide the click data of the user to the server computer.

10. The system of claim 8, wherein the manner the user clicked on the virtual keys of the virtual keyboard to enter the password includes a length of time from when the user clicked on a virtual key of a first character of the password up to when the user clicked on a virtual key of a second character of the password.

11. The system of claim 8, wherein the manner the user clicked on the virtual keys of the virtual keyboard to enter the password includes a length of time the user pressed on a virtual key of a first character of the password.

12. A method of login authentication for a computer service, the method comprising:
providing, over a computer network, a virtual keyboard to a computer of a user;
detecting a first sequence of characters entered by a user by clicking on virtual keys of the virtual keyboard;
detecting a manner the user clicked on the virtual keys of the virtual keyboard to enter the first sequence of characters;
comparing the manner the user clicked on the virtual keys of the virtual keyboard to enter the first sequence of characters to a manner an authorized user of the computer service clicked on the virtual keys of the virtual keyboard to enter a second sequence of characters, the virtual keyboard being uniquely assigned by the computer service to the authorized user such that locations of characters in a character array of the virtual keyboard are unique relative to locations of characters in character arrays of other virtual keyboards assigned by the computer service to other authorized users of the computer service;
comparing the first sequence of characters to the second sequence of characters; and
allowing the user to access the computer service when the first sequence of characters matches the second sequence of characters, and the manner the user clicked on the virtual keys of the virtual keyboard to enter the first sequence of characters matches the manner the authorized user of the computer service clicked on the virtual keys of the virtual keyboard to enter the second sequence of characters.

13. The method of claim 12, wherein detecting the manner the user clicked on the virtual keys of the virtual keyboard to enter the first sequence of characters comprises:
measuring a length of time from when the user clicked on a first character of the first sequence of characters to when the user clicked on a second character of the first sequence of characters.

14. The method of claim 12, wherein detecting the manner the user clicked on the virtual keys of the virtual keyboard to enter the first sequence of characters comprises:
measuring a length of time the user pressed on a first character of the first sequence of characters.

* * * * *